United States Patent [19]  
Karl

[11] 4,038,206  
[45] July 26, 1977

[54] HYDROXYALKYL LOCUST BEAN/XANTHOMONAS HYDROPHILIC COLLOID BLENDS

[75] Inventor: Curtis Lee Karl, Minneapolis, Minn.

[73] Assignee: General Mills Chemicals, Inc., Minneapolis, Minn.

[21] Appl. No.: 649,306

[22] Filed: Jan. 15, 1976

[51] Int. Cl.$^2$ .............................................. B01J 13/00
[52] U.S. Cl. .................... 252/316; 106/205; 106/208; 252/8.5 A; 252/8.5 C; 252/8.55 R
[58] Field of Search ................. 252/316; 106/205, 208

[56] References Cited

U.S. PATENT DOCUMENTS

| | | | |
|---|---|---|---|
| 3,326,890 | 6/1967 | Engelskirchen et al. | 252/316 X |
| 3,391,061 | 7/1968 | McNeely | 252/316 X |
| 3,557,016 | 1/1971 | Schuppner, Jr. | 252/316 |
| 3,625,889 | 12/1971 | Branscum | 252/316 X |

Primary Examiner—Richard D. Lovering  
Attorney, Agent, or Firm—Gene O. Enockson; Patrick J. Span; Elizabeth Tweedy

[57] ABSTRACT

A blend of xanthomonas gum and water soluble hydroxyalkyl ether of locust bean gum which has unique thickening properties. The blend is particularly useful in drilling oil wells and in oil well fracturing fluids.

6 Claims, No Drawings

HYDROXYALKYL LOCUST BEAN/XANTHOMONAS HYDROPHILIC COLLOID BLENDS

This invention relates to thickening compositions. More particularly, this invention relates to thickening compositions comprising blends of xanthomonas gum and water soluble hydroxyalkyl ethers of locust bean gum.

These thickeners exhibit high suspending capacity and viscosities which particularly make them suitable for suspending cuttings produced in oil well drilling and suspending proppants in fracturing earth strata.

BACKGROUND OF THE INVENTION

THICKENEING PARAMETERS

Natural and synthetic gums have been used as thickeners for foods, coatings, paints, dyes, explosive slurries, oil well fluids and many other applications. Thickeners impart viscosity to sols in which they are incorporated. When shear force through agitation is applied to the sol and there is no change in viscosity, the behavior of the thickener is said to be nonplastic. When the viscosity of the sol in a quiescent state is greater than when a shear force is applied through agitation, the thickener is said to be plastic. The viscosity of the sol will decrease as the shear force applied increases. The viscosity immediately develops again when the magnitude of shear force is decreased. Generally, when the plastic sol is at rest, the molecules arrange themselves into a more or less stable form. In order to break this stable molecular arrangement and cause the sol to yield, the application of a shear force is necessary. The shear force required to cause the plastic sol to yield and flow is termed the gel strength. Once the gel strength of a plastic sol is overcome, the viscosity of the sol decreases as greater shear force is applied.

PREVIOUSLY USED XANTHOMONAS GUM THICKENING SYSTEMS

Xanthomonas gum is a known thickener exhibiting extraordinary suspending properties. Aqueous sols of xanthomonas gum are plastic in nature and exhibit higher gel strengths than sols of most gum or gums. Blends of xanthomonas gum and various natural gums are known and each blend exhibits properties unique unto itself. Among these combinations are (1) xanthomonas gum and guar gum, (2) xanthomonas gum and locust bean gum, and (3) xanthomonas gum and hydroxyalkyl ethers of guar.

Blends of xanthomonas gum and locust bean gum are disclosed in U.S. Pat. No. 3,557,016. These blends produce heat reversible, three-dimensional, stable gels upon heating at a temperature of about 150° F. to 180° F. and subsequently cooling the sol. The gels are quite cohesive and exhibit viscosities and gel strengths measurements two or three times higher than before heating. It was disclosed that the limiting temperature parameter is that locust bean gum is only sparingly soluble in water at 70° F . and its solubility increases gradually above this point with increasing temperature.

Blends of xanthomonas gum and hydroxyalkyl ether of guar are known thickening materials as disclosed in U.S. Pat. No. 3,748,201. Aqueous sols of hydroxyalkyl ether of guar alone are not plastic and exhibit little or no gel strength. The thickening compositions including xanthomonas gum and hydroxyalkyl ether of guar are plastic in character. At certain concentrations of this gum blend, the sols have higher gel strengths than can be obtained from xanthomonas gum alone. At certain concentrations, the aqueous sols containing these thickening compositions exhibit viscosity differentials than do sols containing xanthomonaas gum alone. In addition, the aqueous sols exhibit a greater drop in viscosity as the thickening composition concentration is reduced than do aqueous sols of xanthomonas gum alone. The blends of hydroxyalkyl guar and xanthomonas gum do not develop as high viscosities as the corresponding guar and xanthomonas gum combinations.

SUMMARY OF THE INVENTION

The blend of gums of this invention comprises blends of xanthomonas gum in an amount of about 5% to 70% by weight of the total blend and hydroxyalkyl locust bean gum in amounts of about 95% to 30% by weight of the total blend. These blends exhibit pronounced increased gel-strengths over both xanthomonas gum alone and xanthomonas gum blended with locust bean gum. Most useful are those blends containing about 10 to 40% by weight xanthomonas gum and 90% to 60% hydroxyalkyl locust bean gum. The hydroxyalkyl locust bean gums include the water soluble hydroxypropyl ethers of locust bean gum, hydroxyethyl ethers of locust bean gum and hydroxybutyl ethers of locust bean gum. The preferred molar ratio of derivatization are from about 0.05 to 0.50 mole of the alkylene oxide to one mole of locust bean gum and most preferably about 0.10 to 0.35 mole of the alkylene oxide to one mole of locust bean gum. In aqueous sols, these blends of hydroxyalkyl locust bean gum and xanthomonas gum are plastic and produce greater viscosities and suspending capacity than either component alone.

Unlike the known xanthomonas gum-locust bean gum combinations, aqueous sols of xanthomonas gum-hydroxyalkyl locust bean gum combinations do not form heat reversible, three dimensionally stable gels. Hydroxyalkyl locust bean gum-xanthomonas gum combinations possessed good stability to temperature cylces compared to xanthomonas gum-locust bean gum combinations. An 0.5% aqueous sol of 4:1 by weight hydroxypropyl locust bean gum-exanthomonas gum, heated to and held at 150° F. for 30 minutes before cooling back to room temperature, will remain fluid and have about the same viscosity and gel strength as before heating. Similar sols of 4:1 by weight xanthomonas gum-locust bean gum after the same temperature-time cycle were soft gels with viscosity and gel strength readings two or three times higher than before heating.

Aqueous sols of the xanthomonas gum-hydroxyalkyl locust bean gum combination develop higher viscosities than xanthomonas gum-locust bean gum combinations. This increased viscosity is unexpected not only in respect to xanthomonas gum-locust bean gum combinations but also in respect to xanthomonas gum-hydroxyalkyl guar gum combinations. Xanthomonas gum-hydroxyalkyl guar gum combinations exhibit lower viscosity measurements than do xanthomonas gum and guar gum combinations. Furthermore, unlike xanthomonas gum-hydroxyalkyl guar gum combinations which produce decreasing viscosities as hydroxyalkyl substitution increases, the xanthomonas gum-hydroxyalkyl locust bean gum combinations exhibit a peak in viscosity at a molar ratio between about 0.10 and 0.35.

DETAILS OF THE INVENTION

Xanthomonas gum is one component in the thickening compositions of the present invention. Xanthomonas gum can be made by the fermentation of carbohydrate with bacteria of the genus Xanthomonas. Representative of these bacteria are *Xanthomonas campestris, Xanthomonas phaseoli, Xanthomonas mulvacearn, Xanthomonas carotae, Xanthomonas translucens, Xanthomonas hederae* and *Xanthomonas papavericoli*. The gum produced by the bacteria *Xanthomonas campestris* is preferred for the purpose of this invention. The fermentation usually involves inoculating a fermentable broth containing a carbohydrate, various minerals and a nitrogen yielding compound. A number of modifications in the fermentation procedure and subsequent processing are commercially used. Due to the variety of fermentation techniques and differences in processing operation subsequent to fermentation, different production lots of xanthomonas gum will have somewhat different solubility and viscosity properties. Xanthomonas gums useful in the practice of the present invention are relatively hydratable xanthomonas gums.

The xanthomonas gum used in the blends of xanthomonas gum and hydroxypropyl locust bean gum discussed in detail below was made according to the following procedure. In the first step, the bacteria were grown on an agar slant. In the second step, bacteria from the slant were used to inoculate two liter aliquots of a fermentable broth containing per liter: sucrose, 20 grams; $Na_2HPO_4.12H_2O$, 8 grams; $NaH_2PO_4$, 1 gram; $MgSO_4.7H_2O$, 0.25 gram; and 90 grams of cooked soy meal dispersion. The cooked soy meal dispersion was made by agitating at 180 rpm, 90 grams of soy meal in 600 ml. of water at a temperature of 90° C. for a period of 30 minutes and then centrifuging and discarding the residue. The above broth was allowed to ferment for a period of 31 hours at a temperature of about 28° to 30° C. In the third step, the broth was used to inoculate a 15 liter batch containing the same broth composition. The broth of the third step was allowed to ferment for a period of 29 hours at a temperature of about 28° to 30° C. The broth from the third step was used to inoculate a 15,000 liter batch of broth having the composition per liter of broth, sucrose, 20 grams; cooked soy meal dispersion, 6 grams; rapeseed oil 0.65 gram; sulfuric acid, 0.53 gram; $MgSO_4.7H_2O$, 0.25 gram; $Na_2HPO4.12H_2O$, 15 grams and tap water. The final batch was allowed to ferment for a period of about 72 hours at a temperature of about 28° to 30° C. At the end of the final fermentation period, the broth was steam sterilized to destroy all the viable microorganisms. The $p^H$ of the broth was then adjusted to 7.9 by the addition of potassium hydroxide and the gum recovered from the broth by the addition of isopropyl alcohol.

The hydroxyalkyl ether of locust bean gum used in the thickening composition of the present invention can be made by reacting locust bean gum with alkylene oxide in the presence of a alkaline catalyst. Useful alkylene oxides include alkylene oxide containing two to four carbon atoms, namely ethylene oxide, propylene oxide and butylene oxide. 1,2-butylene oxide is a common commercial chemical. 2,3-butylene oxide is generally present in crude mixtures with 1,2-butylene oxide. The alkylene oxide forms an ether linkage with a hydroxyl group of the locust bean gum. The moloar ratio of substitution useful in the practice of this invention is about 0.05 to about 0.5 and preferably about 0.1 to about 0.35.

In order for the reaction between the locust bean gum and the alkylene oxide to proceed, the presence of an alkaline catalyst is necessary. Such catalysts are in general the alkali metal or alkaline earth metal hydroxides such as sodium, potassium or calcium hydroxide. Ammonia may also be used, as well as more complex basic catalysts such as benzyl trimethyl ammonium hydroxide. No special advantage, however, is obtained by the use of more exotic basic or alkaline catalysts over the use of sodium hydroxide which is commonly available.

Very small amounts of catalyst may be employed, as low as 0.05% based on the weight of the locust bean gum. It is generally not necessary to exceed 10% by the weight of the locust bean gum although larger amounts might be used. In general, about 2% to 3% by weight of the locust bean gum is employed.

The reaction can be conducted at room temperature or elevated temperatures. The temperature range in which the reaction is generally conducted is about 17° C. to about 100° C. While higher temperatures can be used, such as up to 125° C., there is generally no advantage achieved.

The reaction can be conducted at atmospheric pressure under reflux, or at elevated pressures in a closed reactor. The exact pressure is not critical and while higher pressure may be employed, operation is normally conducted at whatever pressure develops during the reaction. Generally, such autogenous pressures will be on the order of from about 30 to 125 p.s.i.g.

The reaction may be conducted in the substantial absence of water or solvent (no water added) although the efficiency of the reaction is very low without the addition of water. Accordingly, the reaction is generally conducted in the presence of water to provide higher reaction efficiency. In the absence of other solvents, catalytic amounts of water on the order of about 3 to 8% by weight based on the locust bean gum are employed. These small amounts are generally used where higher temperatures and elevated pressures are employed, whereas larger amounts of water are used when lower temperatures and atmospheric pressure are employed. Further, other organic solvents either water-miscible or water-immiscible organic solvents can be employed. Illustrative of such organic solvents are isopropanol (water-miscible) and heptane (water-immiscible). Other unreactive oragnic solvents may be employed although the two mentioned are preferred. Such other organic solvents are the common aliphatic hydrocarbons having from 5 to 10 carbon atoms which are commerically available, such as heptane and hexane. Alcohols higher than methanol, those having from 2 to 6 carbon atoms, may be employed also such as t-butanol, the only requirement being that the solvent be substantially unreactive. Where higher water levels are employed, the water should be sufficient to swell the locust bean gum slightly, threby making the gum more reactive. When employed with a solvent, such as isopropanol or heptane, from about 10 to 80% water, based on the weight of locust bean gum, is employed. The preferred amount of water is about 30 to 70% with the water-immiscible solvents and about 20 to 30% with the water-immiscible solvents.

Where organic solvents are employed, they are generally present in an amount up to eight times the amount of gum by weight, although larger amounts may be employed, if desired. Generally, with water-miscible solvents, an amount equal to one to three times the weight of gum is employed. With water-immiscible solvents, an amount of from three to five times the weight of gum is generally employed. With the organic solvents, the ratio by weight of water to organic solvent is preferably within the range of about 0.05 to 0.5. A range of 0.2 to 0.45 is preferred with the water-miscible organic solvents and from about 0.1 to 0.2 is preferred with the water-immiscible organic solvents. In general, any unreactive organic solvent may be empolyed. With the lower ratios of water to organic solvent, the reaction is slower. With the higher ratios, the recovery of product by filtration is slowed.

The thickening compositions of this invention can be made by dry blending xanthomonas gum and hydroxyalkyl ether of locust bean gum. The blends contain about 30% t 95% hydroxyalkyl ether of locust bean gum by weight. A sol of a particular blend can be made by mixing the blend into water or other aqueous fluid with agitation and then allowing the sol to stand until hydration of the components is complete. Hydration at room temperature is usually complete after a few hours.

The rheological properties of aqueous sols made from blends of (1) xanthomonas gum and locust bean gum, (2) xanthomonas gum and hydroxypropyl guar gum, (3) xanthomonas gum and hydroxypropyl locust bean gum and (4) xanthomonas gum and hdroxyethyl locust bean gum are set out in detail in Tables 1 to 4. The hydroxypropyl guar component used for illustration was prepared as follows: 100 parts of guar gum, 100 parts of water and three parts of sodium hydroxide were placed in a mixer and mixed for about 15 minutes. Propylene oxide in the molar ratios shown below was added. The mixture was heated to and held at a temperature of 75° to 85° C. until the pressure dropped to zero p.s.i.g. The reaction mixture was then cooled to a temperature below 50° C. and neutralized with acetic acid. The product was pressed between rollers at a pressure of 1250 p.s.i.g. and a temperature of 60° C. and dried further in a forced air oven at a temperature of 60° C. It was then ground.

The sols used in obtaining the measurements shown in Tables 1to 4 were made according to the following procedure. Water in the amount of 398 grams was agitated in a Waring Blender at a speed required to form a vortex one-half the distance from the water surface to the blades. To the water being agitated was added 2.0 grams of a given blend or component gum. This amount of blend produced sol containing 0.5% blend of component gum by weight. Stirring was continued for 60 seconds and the mixture was transferred to a 600 ml. beaker. All of the sols contained 0.5% by weight of the gum combinations and the $P^H$ was neutral.

EXAMPLE 1

GEL STRENGTH

Below is a comparison of the gel strength measurements obtained from combinations of (1) xanthomonas gum and locust bean gum (2) xanthomonas gum and hydroxypropyl locust bean gum, (3) xanthomonas gum and hydroxyethyl locust bean gum and (4) xanthomonas gum and hydroxypropyl guar gum. The measurements were made using a Model 35 Fann VG Viscometer by the following procedure. The sols were made as described above and contained 0.5% by weight of the respective blends. The particular sol was agitated for one minute at 600 rpm. Agitation was stopped and the sol was kept in a quiescent state for three minutes. Agitation was again started at 3 rpm and the maximum deflection on the dial was recorded. The dial reading wad recorded in terms of puonds per square foot. The results are shown in Table 1.

TABLE 1

GEL STRENGTH (Lbs./100 sq. ft.)

| BLEND COMPONENT | Molar Ratio of Substitution | XANTHOMONAS GUM/COMPONENT RATIO BY WEIGHT IN BLEND ||||||||| |
|---|---|---|---|---|---|---|---|---|---|---|
| | | 0/100 Control | 10/90 | 20/80 | 30/70 | 40/60 | 50/50 | 70/30 | 90/10 | 100/0 Control |
| Locust Bean Gum (Control) | 0 | 1.0 | 24.0 | 35.0 | 36.0 | 20.0 | 15.0 | 12.0 | 12.0 | 12.0 |
| Hydroxypropyl Locust Bean Gum | 0.12 | 1.0 | 23.0 | 37.0 | 42.0 | 36.0 | 31.0 | 18.0 | 13.0 | 12.0 |
| | 0.25 | 1.0 | 23.0 | 39.0 | 44.0 | 40.0 | 28.0 | 19.0 | 13.0 | 12.0 |
| | 1.00 | 2.0 | 8.0 | 10.0 | 11.0 | 11.0 | 11.0 | 11.0 | 11.0 | 12.0 |
| Hydroxyethyl Locust Bean Gum | 0.12 | 1.0 | 22.0 | 34.0 | 39.0 | 38.0 | 28.0 | 15.0 | 12.0 | 12.0 |
| | 0.25 | 1.4 | 13.2 | 22.4 | 26.8 | 24.0 | 20.0 | 13.8 | 12.6 | 12.8 |
| | 0.50 | 1.4 | 4.0 | 6.0 | 7.2 | 8.2 | 9.4 | 10.8 | 12.0 | 12.8 |
| | 1.00 | 1.2 | 2.2 | 3.6 | 4.8 | 6.4 | 7.6 | 9.8 | 11.8 | 12.8 |
| Hydroxypropyl Guar | 0.12 | 3.0 | 5.6 | 6.6 | 7.6 | 9.8 | 10.2 | 12.2 | — | 13.2 |
| | 0.25 | 1.2 | 3.0 | 5.0 | 6.8 | 8.6 | 10.0 | 12.0 | — | 13.2 |
| | 0.50 | 3.8 | 5.4 | 6.6 | 8.0 | 9.4 | 10.4 | 12.6 | — | 13.2 |
| | 0.75 | 3.2 | 4.2 | 5.0 | 0.4 | 7.8 | 9.2 | 12.4 | — | 13.2 |

EXAMPLE II

VISCOSITY PROFILE

Viscosity measurements illustrating the rheological properties of the gum blends of this invention and of the most closely related gum blends to them were made according to the following procedure. After preparing the sols as described above, the sols were allowed to rest for two hours. The viscosity measurements were made using both a Brookfield LVT Viscometer equipped with a No. 3 spindle rotating at 20 rpm and a Model 35 Fann VG Viscometer operating at 300 rpm. The temperature of all the samples was 25° C. All of the sols contained 0.5% by weight gum blend and the $p^H$ was neutral. The results are shown in Tables 2 to 4.

TABLE 2

VISCOSITY PROFILE OF HYDROXYPROPYL LOCUST BEAN GUM AND XANTHOMONAS GUM BLENDS

| Molar Ratio of Substitution | XANTHOMONAS GUM/HYDROXYPROPYL LOCUST BEAN GUM RATIO BY WEIGHT IN BLEND |||||||||  |
|---|---|---|---|---|---|---|---|---|---|
| | 0/100 Control | 10/90 | 20/80 | 30/70 | 40/60 | 50/50 | 70/30 | 90/10 | 100/0 Control |
| | FANN VISCOMETER MEASUREMENTS ||||||||| |
| Control 0 | 19 | 42 | 52 | 42 | 37 | 34 | 30 | 28 | 26 |
| 0.12 | 23 | 53 | 66 | 69 | 64 | 54 | 38 | 29 | 28 |

TABLE 2-continued
VISCOSITY PROFILE OF HYDROXYPROPYL LOCUST BEAN GUM AND XANTHOMONAS GUM BLENDS

| Molar Ratio of Substitution | XANTHOMONAS GUM/HYDROXYPROPYL LOCUST BEAN GUM RATIO BY WEIGHT IN BLEND | | | | | | | | |
|---|---|---|---|---|---|---|---|---|---|
| | 0/100 Control | 10/90 | 20/80 | 30/70 | 40/60 | 50/50 | 70/30 | 90/10 | 100/0 Control |
| 0.25 | 31 | 61 | 68 | 73 | 67 | 57 | 38 | 30 | 27 |
| 1.00 | 43 | 52 | 53 | 51 | 47 | 43 | 33 | 26 | 23 |
| BROOKFIELD VISCOMETER MEASUREMENTS | | | | | | | | | |
| Control 0 | 35 | 2550 | 4100 | 3180 | 2800 | 2100 | 1540 | 1370 | 1350 |
| 0.12 | 58 | 2550 | 3450 | 5000 | 4550 | 3500 | 2280 | 1400 | 1340 |
| 0.25 | 84 | 2340 | 4680 | 5450 | 4550 | 3550 | 2350 | 1430 | 1330 |
| 1.00 | 144 | 1570 | 2050 | 2270 | 2300 | 2170 | 1670 | 1430 | 1410 |

TABLE 3
VISCOSITY PROFILE OF HYDROXYETHYL LOCUST BEAN GUM AND XANTHOMONAS GUM BLENDS

| Molar Ratio of Substitution | XANTHOMONAS GUM/HYDROXYETHYL LOCUST BEAN GUM RATIO BY WEIGHT OF BLEND | | | | | | | | |
|---|---|---|---|---|---|---|---|---|---|
| | 0/100 Control | 10/90 | 20/80 | 30/70 | 40/60 | 50/50 | 70/30 | 90/10 | 100/0 Control |
| FANN VISCOMETER MEASUREMENTS | | | | | | | | | |
| Control 0 | 19 | 42 | 52 | 42 | 37 | 34 | 30 | 28 | 26 |
| 0.12 | 30 | 56 | 67 | 71 | 67 | 56 | 38 | 29 | 28 |
| 0.25 | 42 | 55 | 63 | 66 | 62 | 57 | 40 | 31 | 28 |
| 0.50 | 42 | 45 | 47 | 45 | 44 | 41 | 36 | 30 | 33 |
| 1.00 | 38 | 36 | 39 | 37 | 36 | 35 | 33 | 30 | 33 |
| BROOKFIELD VISCOMETER MEASUREMENTS | | | | | | | | | |
| Control 0 | 35 | 2500 | 4150 | 3180 | 2850 | 2100 | 1540 | 1370 | 1350 |
| 0.12 | 76 | 2450 | 3600 | 4450 | 4520 | 3750 | 2340 | 1430 | 1340 |
| 0.25 | 130 | 2010 | 2650 | 3500 | 3260 | 3120 | 1960 | 1440 | 1370 |
| 0.50 | 140 | 780 | 1090 | 1210 | 1280 | 1200 | 1380 | 1320 | 1500 |
| 1.00 | 130 | 260 | 510 | 640 | 720 | 880 | 1140 | 1270 | 1580 |

TABLE 4
VISCOSITY PROFILE OF HYDROXYPROPYL GUAR GUM AND XANTHOMONAS GUM BLEND

| Molar Ratio of Substitution | XANTHOMONAS GUM/HYDROXYPROPYL GUAR GUM RATIO BY WEIGHT OF BLEND | | | | | | | | |
|---|---|---|---|---|---|---|---|---|---|
| | 0/100 Control | 10/90 | 20/80 | 30/70 | 40/60 | 50/50 | 70/30 | 90/10 | 100/0 Control |
| FANN VISCOMETER MEASUREMENTS | | | | | | | | | |
| Contr0l 0 | 47 | 54 | 59 | 63 | 62 | 62 | 56 | — | 45 |
| 0.12 | 39 | 40 | 43 | 45 | 50 | 50 | 50 | — | 45 |
| 0.25 | 31 | 41 | 47 | 50 | 54 | 55 | 55 | — | 45 |
| 0.50 | 38 | 39 | 41 | 44 | 46 | 48 | 50 | — | 45 |
| 0.75 | 34 | 36 | 38 | 41 | 43 | 46 | 50 | — | 45 |
| BROOKFIELD VISCOMETER MEASUREMENTS | | | | | | | | | |
| Control 0 | 800 | 1800 | 2155 | 3170 | 2085 | 2000 | 1770 | — | 1420 |
| 0.12 | 212 | 684 | 836 | 936 | 1162 | 1264 | 1386 | — | 1420 |
| 0.25 | 66 | 466 | 740 | 942 | 1050 | 1156 | 1374 | — | 1420 |
| 0.50 | 356 | 428 | 798 | 960 | 1096 | 1270 | 1438 | — | 1420 |
| 0.75 | 276 | 404 | 534 | 738 | 906 | 1116 | 1388 | — | 1420 |

The embodiments of the invention in which an exclusive property of privilege is claimed are defined as follows:

1. A thickener blend comprising about 5% to 70% xanthomonas gum by weight of the thickener blend and about 95% to 30% hydroxyethyl ether of locust bean gum having a molar ratio of substitution of about 0.05 to 0.05 moles of ethylene oxide to one mole of locust bean gum.

2. The thickener blend of claim 1 wherein the thickener blend comprises about 10% to 40% xanthomonas gum by weight of the blend and about 90% hydroxyethyl locust bean gum by weight of the blend.

3. The thickener blend of claim 2 wherein the molar ratio of substitution is about 0.1 to 0.35.

4. A thickener blend comprising about 5% to 70% xanthomonas gum by weight of the thickener blend and about 95% to 30% hydroxypropyl ether of locust bean gum having a molar ratio of substitution of about 0.05 to 0.50 moles of propylene oxide to one mole of locust bean gum.

5. The thickener blend of claim 4 wherein the thickener blend comprises about 10% to 40% xanthomonas gum by weight of the blend and about 90% to 60% hydroxypropyl locust bean gum by weight of the blend.

6. The thickener blend of claim 5 wherein the molar ratio of substitution is about 0.1 to 0.35.

* * * * *

UNITED STATES PATENT AND TRADEMARK OFFICE
CERTIFICATE OF CORRECTION

PATENT NO. : 4,038,206

DATED : August 17, 1977

INVENTOR(S) : Curtis Lee Karl

It is certified that error appears in the above–identified patent and that said Letters Patent are hereby corrected as shown below:

Col. 2, line 5, insert "greater" between exhibit and viscosity

Col. 2, line 51, "or" should read - to

Col. 4, line 63, "water-immiscible" should read - water-miscible

Col. 7, Claim 1, line 5, "0.05" should read - 0.50

Col 7, Claim 2, line 3, "90%" should read - 90% to 60%

Signed and Sealed this

First Day of November 1977

[SEAL]

Attest:

RUTH C. MASON
*Attesting Officer*

LUTRELLE F. PARKER
*Acting Commissioner of Patents and Trademarks*